(12) United States Patent
Lalancette et al.

(10) Patent No.: US 7,780,941 B1
(45) Date of Patent: Aug. 24, 2010

(54) POTASSIUM MAGNESIUM FERTILIZER

(75) Inventors: Jean-Marc Lalancette, Sherbrooke (CA); David Lemieux, Thetford Mines (CA); Bertrand Dubreuil, Trois-Rivieres (CA)

(73) Assignee: Nichromet Extraction Inc. (CA)

( * ) Notice: Subject to any disclaimer, the term of this patent is extended or adjusted under 35 U.S.C. 154(b) by 0 days.

(21) Appl. No.: 12/497,989

(22) Filed: Jul. 6, 2009

(30) Foreign Application Priority Data

Apr. 6, 2009 (CA) .................................. 2661479

(51) Int. Cl.
*C01D 5/12* (2006.01)
*C05D 1/00* (2006.01)
*C05D 5/00* (2006.01)

(52) U.S. Cl. .................. 423/544; 423/551; 423/552; 423/554; 71/31; 71/61; 71/63

(58) Field of Classification Search .............. 423/544, 423/551, 552, 554; 71/31, 61, 63
See application file for complete search history.

(56) References Cited

U.S. PATENT DOCUMENTS

| 2,902,344 A | * | 9/1959 | Cevidalli et al. ............ 423/161 |
| 3,726,965 A | * | 4/1973 | Neitzel et al. ............... 423/551 |
| 5,102,441 A | * | 4/1992 | Zentgraf et al. ................ 71/63 |
| 2002/0114759 A1 | * | 8/2002 | Cabello-Fuentes .......... 423/482 |

FOREIGN PATENT DOCUMENTS

JP    57-129823 A  *  8/1982

OTHER PUBLICATIONS

Shreve, R. Norris, "Mannheim Process", *Chemical Process Industries*, Third Edition (McGraw-Hill 1967), p. 346.

* cited by examiner

*Primary Examiner*—Timothy C Vanoy
(74) *Attorney, Agent, or Firm*—Schwegman, Lundberg & Woessner, P.A.

(57) ABSTRACT

A process for producing potassium magnesium sulfate, comprising reacting sulfuric acid with potassium chloride and magnesium chloride at a temperature in a range comprised between about 100 and about 160° C., thereby producing potassium magnesium sulfate and hydrochloric acid, the sulfuric acid being reacted with potassium chloride and magnesium chloride simultaneously or sequentially.

34 Claims, 1 Drawing Sheet

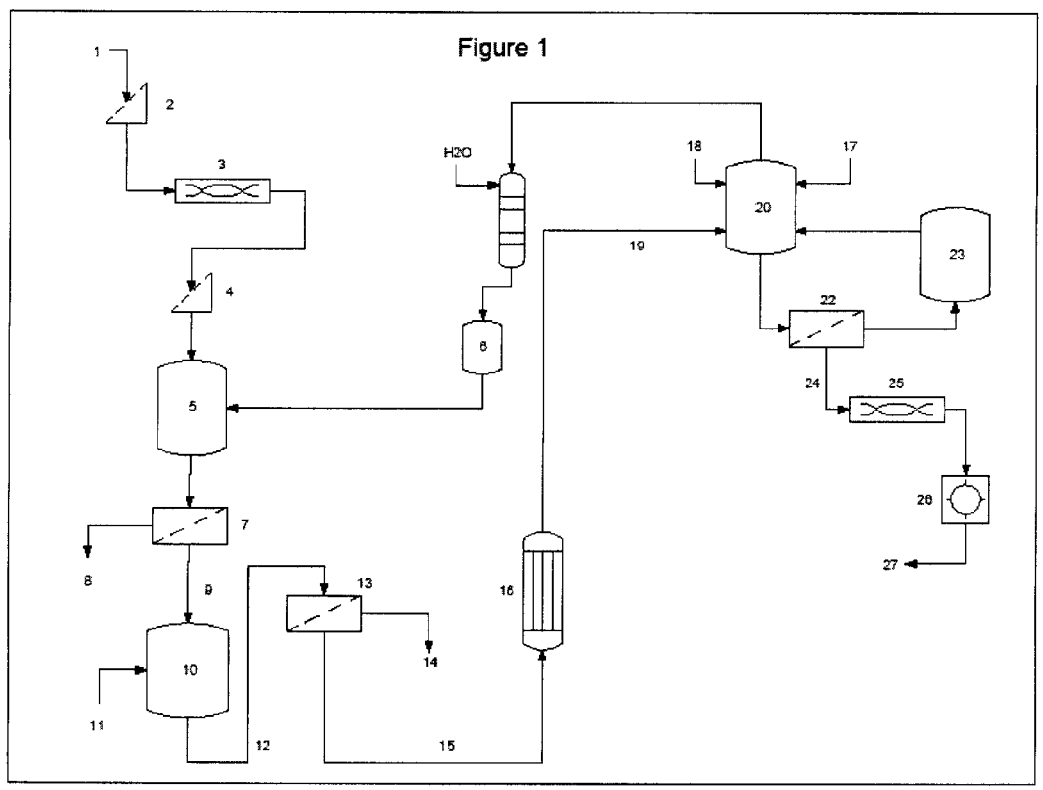

POTASSIUM MAGNESIUM FERTILIZER

CROSS REFERENCE TO RELATED APPLICATIONS

This application claims priority on Canadian application serial No. 2,661,479, filed on Apr. 6, 2009. All documents above are incorporated herein in their entirety by reference.

FIELD OF THE INVENTION

The present invention relates to fertilizers. More specifically, the present invention is concerned with production of potassium magnesium sulfate.

BACKGROUND OF THE INVENTION

On the one hand, potassium magnesium sulfate (SOPM) is a very desirable fertilizer used in intensive agriculture, incorporating three agronomic elements: potassium, magnesium and sulfur. However, as a mined product, SOPM not only is found in diminishing quantities, but also has a chlorine content of one to several percent, which reduces its efficiency in agricultural applications. A synthetic approach allowing nearly chlorine-free SOPM would therefore ensure high quality supplies and intensive uses without the sterilizing effect of chloride on soils.

It is known to generate hydrochloric acid from the action of sulfuric acid on a chloride. At temperatures in the range between 100 and 160° C., the reaction of sulfuric acid with potassium chloride (potash) leads to hydrochloric acid and an acid potassium sulfate, $KHSO_4$, as follows:

$$H_2SO_4 + KCl \rightarrow KHSO_4 + HCl \quad \text{(Equation I)}$$

In order to achieve the complete substitution of potassium for both hydrogens on the sulfuric acid, much higher temperatures are required, in the range of 400° C., as well noted in the art (Mannheim process, Chemical Process Industries, R. N. Shreeve, McGraw-Hill, 3rd ed., 1967, p. 346). At this temperature, HCl is obtained together with potassium sulfate $K_2SO_4$ as follows:

$$H_2SO_4 + 2KCl \rightarrow K_2SO_4 + 2HCl \quad \text{(Equation II)}$$

As people in the art will appreciate, such a high temperature reaction leads to severe corrosion problems, difficult heat transfer and large energy consumption.

Therefore, there is a need in the art for a method to overcome the above-mentioned shortcomings.

SUMMARY OF THE INVENTION

More specifically, there is provided a process for producing potassium magnesium sulfate, comprising reacting sulfuric acid with potassium chloride and magnesium chloride at a temperature in a range comprised between about 100 and about 160° C., thereby producing potassium magnesium sulfate and hydrochloric acid.

Other objects, advantages and features of the present invention will become more apparent upon reading of the following non-restrictive description of embodiments thereof, given by way of examples only with reference to the accompanying drawings.

BRIEF DESCRIPTION OF THE DRAWINGS

In the appended drawings:

FIG. 1 is a schematic diagram of a method according to an embodiment of an aspect of the present invention.

DESCRIPTION OF EMBODIMENTS OF THE INVENTION

In a first aspect of the present invention, it is shown that a complete substitution of the hydrogen of sulfuric acid by potassium and magnesium can be done by reacting potassium hydrogen sulfate in a range of temperatures between 100 and 160° C. with magnesium chloride, as follows:

$$2KHSO_4 + H_2SO_4 + 2MgCl_2 \rightarrow K_2SO_4 \cdot 2MgSO_4 + 4HCl \quad \text{(Equation III)}$$

In this reaction, a complete combination of the sulfuric acid with potassium and magnesium in the form of chlorides occurs at atmospheric pressure. Potassium hydrogen sulfate ($KHSO_4$) reacts with magnesium chloride, yielding hydrochloric acid HCl which is removed from the system as soon as it is formed to be absorbed in water.

Equation III applies in a temperature range between 100 and 160° C. Temperatures between 140 and 160° C. allow faster reactions.

This reaction of sulfuric acid with both chlorides can be sequential, wherein sulfuric acid first reacts with KCl to yield potassium hydrogen sulfate, and then with $MgCl_2$ in order to yield SOPM, as happens in the reaction described by Equation III above (see example 1 below).

Alternatively, the reaction of sulfuric acid with both chlorides can be simultaneous, using a mixing of these chlorides, which occurs naturally in carnallite, or which is produced for that purpose.

A natural source of chlorides of potassium and magnesium, such as carnallite [$KCl \cdot MgCl_2 \cdot 6H_2O$] for example, may be used in order to obtain a complete reaction with sulfuric acid, under the same range of mild temperatures of around 100 to 160°, as follows:

$$2[KCl \cdot MgCl_2 \cdot 6H_2O] + 3H_2SO_4 \rightarrow [K_2SO_4 \cdot 2MgSO_4] + 6HCl + 12H_2O \quad \text{(Equation IV)}$$

Thus, hydrochloric acid is generated by the action of sulfuric acid on the chlorides KCl and $MgCl_2$ (see example 2 below).

Such hydrochloric acid may be sold as such.

Moreover, as well known in the art, hydrochloric acid may be used to digest mineral ores, such as serpentine [$3MgO \cdot 2SiO_2 \cdot 2H_2O$] for example, as follows:

$$[3MgO \cdot 2SiO_2 \cdot 2H_2O] + 6HCl \rightarrow 3MgCl_2 + 2SiO_2 + 5H_2O \quad \text{(Equation V)}$$

More precisely, the acid digestion of serpentine with hydrochloric acid yields a crude solution of magnesium chloride contaminated by significant amounts of chlorides of the base metals present in the starting serpentine ore, namely, iron, nickel and chromium. This crude $MgCl_2$ solution may be purified by controlled pH adjustment and filtration of the precipitated transition metals oxides, or hydroxides. This mixture of oxides, because of its nickel and chromium components, can in turn be readily used in metallurgical operations.

It is to be noted that, besides the crude solution of magnesium chloride discussed hereinabove, the leaching of the serpentinic ore leaves an insoluble solid, mostly deprived of magnesium and base metals (see Equation V). Silica ($SiO_2$) is the main component of this solid, as shown in Equation V above, in the temperature range between 100 and 160° C. This silica being the result of chemical leaching, it possesses a very high propensity to dissolution in caustic NaOH as follows:

$$4NaOH + 2SiO_2 \rightarrow 2Na_2O \cdot SiO_2 + 2H_2O \quad \text{(Equation VI)}$$

This last reaction, which is done at about 230° C. under pressure in an autoclave, produces a concentrated solution of sodium orthosilicate or waterglass [$2Na_2O \cdot SiO_2$] (see example 5 below). Thus, due to the high reactivity of the silica resulting from the acid leaching of the serpentinic ore, sodium orthosilicate can be obtained under mild conditions, without the necessity to use fusion of silica with soda ash at 1200° C. as currently practiced to obtain waterglass for example.

As shown by Equations III and IV, the reaction of the sulfuric acid with potassium and magnesium chlorides also yields, besides HCl, potassium magnesium sulfate [$K_2SO_4.2MgSO_4$] (SOPM). Therefore, SOPM can be synthesized by these reactions, which take place at low temperature, in the range between 100 and 160° C. Independently of the sources of KCl and $MgCl_2$ (see examples 1 and 2 below), SOPM with a potassium to magnesium ratio of 2K/2 Mg is obtained (Langbeinite, [$K_2SO_4.2MgSO_4$]), together with a corresponding production of HCl that can be sold as such, or used for mineral leaching as shown above.

In order to insure the neutral character of the produced SOPM, a small amount of MgO can be added to the reaction mixture in Equation III. Moreover, the K/Mg ratios can be adjusted by adding further amount of MgO, thereby yielding equivalent SOPM such as shönite [$K_2SO_4.MgSO_4$] (2K/1Mg ratio) if needed or other K/Mg ratios, if desired.

Moreover, indirectly, SOPM can be produced from the digestion of serpentine, since, as shown in Equation V, it produces magnesium chloride $MgCl_2$. This magnesium chloride $MgCl_2$ may be used to achieve a complete neutralization of sulfuric acid into hydrochloric acid HCl, as shown above in Equations 3 and 4 (see examples 1 and 2 below). Alternatively, the produced magnesium chloride can be recovered either in the form of a solution or as a solid hexahydrate [$MgCl_2.6H_2O$].

In still a further embodiment, exemplified in Example 6 below, SOPM is fabricated using digestion of laterite (see Equation V). Laterites are silicates of serpentinic origin with a Ni content in the range between 0.5 and 2% Ni. In this case, the recovery of nickel is significant, as compared to when leaching serpentine.

In still a further embodiment, exemplified in Example 3 below, SOPM is fabricated using magnesium oxide MgO as a source of magnesium, as follows:

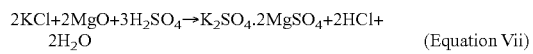

$$2KCl+2MgO+3H_2SO_4 \rightarrow K_2SO_4.2MgSO_4+2HCl+ 2H_2O \quad \text{(Equation Vii)}$$

Therefore, the present method, by involving the reaction of sulfuric acid with a multiplicity of ions (K, Mg) rather than potassium singly (see Equations II, IV and VII), allows producing SOPM, at relatively low temperature and with the avoidance of the extremely corrosive conditions of other techniques such as the Mannheim process (see Equation II).

In a system according to an embodiment of another aspect of the present invention, illustrated by the diagram of FIG. 1, serpentinic tailings (1) are circulated through a grizzly (2) in order to remove rocks larger than two inches. The resulting finer fraction is dried in a rotary dryer (3) and classified through a 14 mesh screen (4). The minus 14 mesh material is admitted to a leaching reactor (5), along with 32% hydrochloric acid (6). The charge is stirred at 100° C. for one hour, and filtrated through a belt filter (7), the insoluble fraction (8) being mostly silica and the filtrate (9), a crude solution of magnesium chloride.

This crude solution is purified in a stirred precipitator (10) by controlled addition of basic calcined magnesia (11). The resulting slurry from the precipitator (12) is directed to a filter (13), where the mixture of iron, nickel and chromium oxides/hydroxides (14) is separated from the cleaned stream of magnesium chloride (15). The concentration of the magnesium chloride is then increased from 20% to 30% $MgCl_2$, by partial evaporation of the stream in an evaporator under vacuum (16).

In parallel with this production of magnesium chloride, silica and base metals oxides/hydroxides, the preparation of SOPM is achieved in a stirred and heated reactor (20), by admission in said reactor of sulfuric acid (17), potash (18) and magnesium chloride (19), in such proportion as to obtain the desired ratio of potassium, magnesium and sulfate in the end product. After a contact time of one hour at 100 to 160° C., the mass is taken up by a saturated brine obtained from previous runs (21), and filtered over a belt filter (22). The saturated brine is stored for further use (23), and the wet sulfate of potassium and magnesium is dehydrated in a dryer (25) and agglomerated in a pelletizing circuit (26), to give the expected particulates of SOPM at the required dimensions (27) for agricultural uses.

Thus, SOPM fertilizer is produced and it has a very low content of chlorine, typically less than 1%, and even less than 0.5%, and incorporates other desirable agronomic elements, magnesium and sulfur, as well known in the art.

The excess magnesium chloride, along with reactive silica and precipitated mixture of base metals oxides/hydroxides, have been found to be useful and negotiable products, particularly the reactive silica after its transformation into waterglass.

Still in FIG. 1, in a separate circuit, the insoluble fraction (8) can be treated in an autoclave with a sodium hydroxide solution at 230° C. to give, after filtration, a solution of sodium silicate.

The present system and method therefore allow a complete reaction of the sulfuric acid (both hydrogens) with potassium and magnesium in the form of chlorides, at relatively low temperatures in the range between 100 and 160° C., which is unexpected in view of the Mannheim process (Equation II), where the substitution of two potassium on the sulfate group requires temperatures of at least 400° C. with very severe problems and limitations, as indicated above.

Moreover, the present system and method therefore allow synthesizing SOPM at relatively low temperatures in the range between 100 and 160° C.

The following examples are presented to illustrate the invention.

In Example 1, production of hydrochloric acid and SOPM is achieved by placing: 77 Kg of 93% sulfuric acid in a glass-lined reactor of two cubic meters heated by a steam jacket and equipped with a stirrer. The system is heated to 160° C. with 100 psi steam in the jacket. Then, 38 Kg of KCl are introduced in the reactor, with stirring. This addition is accompanied by HCl gas evolution (see Equation I). This stream of HCl is directed to an adsorption unit where 32% HCl is formed. After a contact time of 30 minutes, the HCl evolution has subsided and the reaction is completed by addition of 150 Kg of an $MgCl_2$ solution at 28% $MgCl_2$. There is a second evolution of HCl, which is completed after 1½ hour. At this point, mother liquors from previous runs are used to carry out the reaction mass which is filtered and finally dried at 200° C. Thus 107.6 Kg of synthetic langbeinite material, $K_2SO_4.2MgSO_4$ are obtained.

In Example 2, carnallite is reacted with sulfuric acid. A portion of 151.4 g of a 40% w/w carnallite solution is reacted with 34.4 g of a 93% w/w sulfuric solution in a glass container. This mixture is heated for 1 hour at 100-140° C. The water and HCl gas are evaporated, creating a weight loss of 23.6 g HCl and 110.44 g of water. The solid is recovered and dried overnight at 200° C. 45.72 g of solid were collected, containing 5.69 g of Mg, 8.70 g of K and 31.33 g of sulfate.

The composition of the solid is very close to the langbeinite formula [$K_2SO_4 \cdot 2MgSO_4$], with 12.44% Mg, 19.03% K and 68.5% $SO_4$.

In Example 3, potash KCl and magnesium oxide MgO are reacted: a portion of 30.1 g of KCl is reacted with 60.4 g of sulfuric acid 98% in a glass container. This mixture is heated for 30 min. at 110-150° C. followed by addition of 16.2 g of MgO and heating for another 30 min. The water and HCl are evaporated, and then the solid is recovered and dried. 83.9 g of solid are collected, containing 8.2 g of Mg, 16.0 g of K and 58.3 g of sulfate. The composition of the solid is very close to the langbeinite formula, with 9.8% Mg, 19.1% K, 69.5% $SO_4$, 0.2% Cl and 0.6% water-insoluble material.

In Example 4, serpentine is digested with hydrochloric acid as follows: in a 1.5 cubic meters reactor equipped with a stirrer, a mass of one cubic meter of water is heated to 90° C. with steam in order to warm the reactor. This heating water is dumped. Then 285 Kg of HCl 32%, preheated to 60° C., are introduced into the reactor. A serpentinic material (111 Kg), 100% less than 16 mesh, 10% free moisture, is added with stirring to the warm acid.

The reaction is exothermic and the temperature remains at 85° C. for a period of one hour. The reaction slurry is treated with a flocculent, ten liters of organopole 6405, at a concentration of 0.375%. The filtration is done on a belt filter 18" wide with two rinsing zones. The filtrated pulp has a weight of 135 Kg with a water content 50%. The solution including the rinsings has a volume of 390 l. The analysis of the liquid phase indicates a recovery of 89% of the magnesium in the starting serpentine ore, of 94% of the iron, 88% of the nickel and 78% of the chromium. The pH of this solution is 0.7.

In order to purify the magnesium chloride solution, the pH of the solution is raised to 5.0 with basic calcined magnesium oxide. The precipitated oxides/hydroxides are flocculated with organopol 6404 and filtered over a belt filter 18" wide. The solution thus obtained, 400 liters, contains magnesium chloride at a concentration of 20%. The filtrated pulp, made essentially of oxides/hydroxides of iron, chromium and nickel, weighs 15 Kg with a moisture content of 50%.

Example 5 illustrates the formation of sodium silicate from silica residue produced as a result of serpentine leaching. In a 300 ml autoclave 10 g of a crude insoluble fraction, 15 g of NaOH and 15 g of water are placed. The autoclave is heated to 200-240° C. for a period of 3½ hours. The corresponding pressure is 120 psi. After this reaction, the pressure is released after cooling and the resulting solution is filtered to remove insolubles. The filtrate contains 3.7 g of silica, as measured by acidification and purification.

Using a procedure similar to Example 4 of digestion of serpentine with HCl, Example 6 describes digestion of laterite with hydrochloric acid: 150 Kg (20% moisture) of a laterite (having the following composition: 2.2% Ni, 12.9% Fe and 10.0% Mg) is treated with 158 Kg of HCl 32%. After the usual procedure, the recovery of leached nickel is 93%, iron 73% and magnesium, 84%. Procedures known to those familiar with the art allow the isolation of nickel from the FeMgNi solution, such as with ion exchange resins.

Although the present invention has been described hereinabove by way of embodiments thereof, it may be modified, without departing from the nature and teachings of the subject invention as defined in the appended claims.

What is claimed is:

1. A process for producing potassium magnesium sulfate, comprising reacting sulfuric acid with potassium chloride and magnesium chloride at a temperature in a range between about 100 and about 160° C., thereby producing potassium magnesium sulfate and hydrochloric acid.

2. The process of claim 1, wherein the sulfuric acid is simultaneously reacted with the potassium chloride and the magnesium chloride.

3. The process of claim 1, wherein the sulfuric acid is reacted with the potassium chloride and the magnesium chloride sequentially.

4. The process of claim 3, wherein the sulfuric acid is reacted with the potassium chloride, thereby producing potassium hydrogen sulfate; and then the magnesium chloride is added, thereby yielding potassium magnesium sulfate.

5. The process of claim 1, wherein the potassium chloride is in the form of potash.

6. The process of claim 1, wherein at least part of the magnesium chloride is produced by acid leaching of a serpentine ore or a laterite ore with hydrochloric acid.

7. The process of claim 1, wherein at least part of the magnesium chloride is in the form of a 30% magnesium chloride in water.

8. The process of claim 1, wherein at least part of the magnesium is provided by reacting sulfuric acid with magnesium oxide.

9. The process of claim 8, wherein the reaction of sulfuric acid with magnesium oxide is subsequent to the reaction of sulfuric acid with potassium chloride.

10. The process of claim 8, further comprising adjusting a K/Mg ratio of the potassium magnesium sulfate by adding magnesium oxide to the potassium chloride and magnesium chloride.

11. The process of claim 2, wherein said at least part of the potassium chloride and at least part of the magnesium chloride are in the form of carnallite.

12. The process of claim 11, wherein the carnallite is in solution in water.

13. The process of claim 1, wherein the potassium magnesium sulfate has a K/Mg ratio of 2:2.

14. The process of claim 1, wherein the potassium magnesium sulfate has a K/Mg ratio of 2:1.

15. The process of claim 1, wherein the potassium magnesium sulfate comprises less than about 1% of chlorine impurity.

16. The process of claim 1, wherein the potassium magnesium sulfate comprises less than about 0.5% of chlorine impurity.

17. The process of claim 1, wherein the sulfuric acid is an acid at 92 to 98% $H_2SO_4$.

18. The process of claim 17, wherein the sulfuric acid is an acid at 92 to 94% $H_2SO_4$.

19. The process of claim 1, comprising preheating the sulfuric acid to a temperature in the range between 100° C. and 160° C.

20. The process of claim 1, wherein the sulfuric acid is reacted with the potassium chloride and the magnesium chloride at a temperature between about 100° C. and about 160° C.

21. The process of claim 1, wherein the sulfuric acid is reacted with the potassium chloride and the magnesium chloride at a temperature between about 140° C. and about 160° C.

22. The process of claim 20, wherein the sulfuric acid is reacted with the potassium chloride and the magnesium chloride during three hours.

23. The process of claim 1, further comprising adsorbing the hydrochloric acid in water.

24. The process of claim 23, wherein said adsorbing yields a 30 to 35% hydrochloric acid solution.

25. The process of claim 1, further comprising recovering excess magnesium chloride in the form of a solution or a hexahydrate.

26. The process of claim 1, further comprising using the hydrochloric acid to leach a serpentine ore, thereby producing a reaction mixture comprising silica and a mixture of chlorides of magnesium, iron, nickel and chromium.

27. The process of claim 26, wherein the leaching is at a temperature between about 90° C. and about 110° C.

28. The process of claim 27, wherein the serpentinic ore comprises between about 35 and about 41% weight of magnesium oxide.

29. The process of claim 28, further comprising filtering the reaction mixture, thereby producing a liquid portion and a solid portion.

30. The process of claim 29, further comprising recovering the magnesium chloride from the liquid portion.

31. The process of claim 30, wherein the magnesium chloride is recovered from the liquid portion as a 20 to 30% magnesium chloride solution in water.

32. The process of claim 31, wherein said magnesium chloride recovered from the liquid portion is a magnesium chloride produced by acid leaching of a serpentine ore with hydrochloric acid.

33. The process of claim 30, further comprising:
  i. recovering the silica from the solid portion; and
  ii. dissolving the recovered silica in caustic at a temperature of about 230° C. under pressure, thereby producing sodium orthosilicate and waterglass.

34. The process of claim 1, further comprising using the hydrochloric acid to leach magnesium oxide from a laterite ore.

* * * * *